United States Patent
Miller et al.

(10) Patent No.: US 7,889,727 B2
(45) Date of Patent: Feb. 15, 2011

(54) SWITCHING CIRCUIT IMPLEMENTING VARIABLE STRING MATCHING

(75) Inventors: Michael J. Miller, Saratoga, CA (US); Vladan Djakovic, San Francisco, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 69 days.

(21) Appl. No.: 12/028,668

(22) Filed: Feb. 8, 2008

(65) Prior Publication Data
US 2008/0212581 A1    Sep. 4, 2008

Related U.S. Application Data

(62) Division of application No. 11/248,901, filed on Oct. 11, 2005, now Pat. No. 7,353,332.

(51) Int. Cl.
*H04L 12/28* (2006.01)
(52) U.S. Cl. .............. 370/389; 370/392; 370/395.52; 707/E17; 709/232; 709/238; 709/226
(58) Field of Classification Search ........... 370/389, 370/392, 395.5, 412, 2; 707/E17; 709/232, 709/238, 226
See application file for complete search history.

(56) References Cited

U.S. PATENT DOCUMENTS

| | | | |
|---|---|---|---|
| 4,996,666 A | 2/1991 | Duluk, Jr. | |
| 5,051,886 A | 9/1991 | Kawaguchi et al. | |
| 5,140,644 A | 8/1992 | Kawaguchi et al. | |
| 5,151,697 A | 9/1992 | Bunton | |
| 5,278,981 A | 1/1994 | Kawaguchi et al. | |
| 5,386,413 A | 1/1995 | McAuley et al. | |
| 5,414,704 A | 5/1995 | Spinney | |

(Continued)

FOREIGN PATENT DOCUMENTS

EP    0408188 A2    1/1991

(Continued)

OTHER PUBLICATIONS

"Fast Routing Table Lookup Using CAMs", Anthony J. McAuley and Paul Francis, 1993, pp. 1382-1391, IEEE.

(Continued)

*Primary Examiner*—Dang T Ton
*Assistant Examiner*—Mandish Randhawa
(74) *Attorney, Agent, or Firm*—Mahamedi Paradice Kreisman LLP; William L. Paradice

(57) ABSTRACT

A content matching engine (CME) uses a content addressable memory (CAM) array that stores a plurality of strings in separate entries. The strings define one or more rules to be matched. The strings of each rule are linked, thereby providing a required order. The strings of each rule can be linked by per-entry counters associated with each string, or by a state machine. The strings in the CAM array are compared with a packet, which is shifted one symbol at a time (because the strings can start on any boundary). When the CAM detects a match, the CAM skips over the string that resulted in the match, thereby preventing erroneous matches. The CAM allows parallel matching to be performed for multiple rules. If the contents of a packet match all of the strings of a rule, in order, then the CME asserts a match/index signal that identifies the matched rule.

21 Claims, 10 Drawing Sheets

U.S. PATENT DOCUMENTS

| | | | |
|---|---|---|---|
| 5,440,715 A | 8/1995 | Wyland | |
| 5,440,753 A | 8/1995 | Hou et al. | |
| 5,452,451 A | 9/1995 | Akizawa et al. | |
| 5,469,161 A | 11/1995 | Bezek | |
| 5,497,488 A | 3/1996 | Akizawa et al. | |
| 5,525,982 A | 6/1996 | Cheng et al. | |
| 5,615,378 A | 3/1997 | Nishino et al. | |
| 5,712,971 A | 1/1998 | Stanfill et al. | |
| 5,781,431 A | 7/1998 | Duret et al. | |
| 5,963,942 A | 10/1999 | Igata | |
| 5,995,963 A | 11/1999 | Nanba et al. | |
| 5,999,435 A | 12/1999 | Henderson et al. | |
| 6,011,795 A | 1/2000 | Varghese et al. | |
| 6,018,524 A | 1/2000 | Turner et al. | |
| 6,067,574 A | 5/2000 | Tzeng | |
| 6,115,716 A | 9/2000 | Tikkanen et al. | |
| 6,185,524 B1 | 2/2001 | Carus et al. | |
| 6,237,061 B1 | 5/2001 | Srinivasan et al. | |
| 6,311,183 B1 | 10/2001 | Cohen | |
| 6,377,942 B1 | 4/2002 | Hinsley et al. | |
| 6,421,660 B1 | 7/2002 | Glaise | |
| 6,425,099 B1 | 7/2002 | Lattmann et al. | |
| 6,473,846 B1 | 10/2002 | Melchoir | |
| 6,487,566 B1 | 11/2002 | Sundaresan | |
| 6,505,206 B1 | 1/2003 | Tikkanen et al. | |
| 6,538,911 B1 | 3/2003 | Allan et al. | |
| 6,546,391 B1 | 4/2003 | Tsuruoka | |
| 6,560,610 B1 | 5/2003 | Eatherton et al. | |
| 6,628,660 B1 | 9/2003 | Morse | |
| 6,658,524 B1* | 12/2003 | Villaret et al. | 711/108 |
| 6,665,297 B1 | 12/2003 | Hariguchi et al. | |
| 6,760,821 B2 | 7/2004 | Stefan et al. | |
| 6,785,677 B1 | 8/2004 | Fritchman | |
| 6,892,237 B1 | 5/2005 | Gai et al. | |
| 6,952,694 B2 | 10/2005 | Mathur et al. | |
| 6,980,992 B1 | 12/2005 | Hursey et al. | |
| 6,988,189 B1 | 1/2006 | O'Connor et al. | |
| 6,996,662 B2 | 2/2006 | Miller et al. | |
| 7,058,821 B1 | 6/2006 | Parekh et al. | |
| 7,082,044 B2* | 7/2006 | Gould et al. | 365/49.1 |
| 7,130,230 B2* | 10/2006 | Jain et al. | 365/201 |
| 7,134,143 B2 | 11/2006 | Stellenberg et al. | |
| 7,139,753 B2 | 11/2006 | Bass et al. | |
| 7,139,837 B1 | 11/2006 | Parekh et al. | |
| 7,225,188 B1 | 5/2007 | Gai et al. | |
| 7,305,422 B1 | 12/2007 | Wang | |
| 7,330,908 B2 | 2/2008 | Jungck | |
| 7,353,332 B2 | 4/2008 | Miller et al. | |
| 7,440,304 B1 | 10/2008 | Raj | 365/49.1 |
| 7,634,500 B1* | 12/2009 | Raj | 1/1 |
| 7,685,254 B2* | 3/2010 | Pandya | 709/217 |
| 2003/0005146 A1 | 1/2003 | Miller et al. | |
| 2003/0041163 A1 | 2/2003 | Rhoades et al. | |
| 2003/0048785 A1 | 3/2003 | Calvignac et al. | |
| 2003/0065774 A1 | 4/2003 | Steiner et al. | |
| 2004/0028294 A1* | 2/2004 | Fukuda | 382/305 |
| 2004/0054848 A1 | 3/2004 | Folsom | |
| 2004/0133565 A1 | 7/2004 | Hinshaw et al. | |
| 2004/0141510 A1* | 7/2004 | Blanc et al. | 370/401 |
| 2004/0177319 A1 | 9/2004 | Horn | |
| 2004/0199630 A1* | 10/2004 | Sarkissian et al. | 709/224 |
| 2005/0171943 A1* | 8/2005 | Ichino et al. | 707/3 |
| 2006/0031506 A1* | 2/2006 | Redgate | 709/226 |
| 2006/0168273 A1* | 7/2006 | Michael | 709/230 |
| 2006/0221658 A1 | 10/2006 | Gould et al. | |
| 2006/0259498 A1 | 11/2006 | Ellison et al. | |
| 2006/0259508 A1 | 11/2006 | Sikdar et al. | |
| 2007/0075878 A1 | 4/2007 | Furodet et al. | |
| 2007/0088955 A1 | 4/2007 | Lee et al. | |
| 2007/0113170 A1 | 5/2007 | Dignum et al. | |
| 2007/0113222 A1 | 5/2007 | Dignum et al. | |
| 2007/0220232 A1* | 9/2007 | Rhoades et al. | 712/20 |
| 2007/0282835 A1 | 12/2007 | Duxbury | |
| 2008/0052300 A1* | 2/2008 | Horgan | 707/100 |
| 2008/0071765 A1 | 3/2008 | Ichiriu et al. | |
| 2008/0071781 A1 | 3/2008 | Ninan et al. | |
| 2009/0012958 A1 | 1/2009 | Raj | 707/6 |
| 2010/0088756 A1* | 4/2010 | Balakrishnan et al. | 726/13 |

OTHER PUBLICATIONS

"Memory Organization Scheme for the Implementation of Routing Tables in High Performance IP Routers", document dated Nov. 21, 2003, 6 pages.

A Search Algorithm for Table Entries with Non-Contiguous Wildcarding, Paul F. Tsuchiya, Bellcore, 1991, pp. 1-10.

A Tree-Based Packet Routing Table for Berkeley Unix, Keith Sklower, Berkeley Technical Report, UC Berkeley, CA, USA, 1991, pp. 1-14.

Bu et al., "A Keyword Match Processor Architecture using Content Addressable Memory," GLSVLSI '04, Apr. 26-28, 2004, 5 pages.

Efficient String Matching: An Aid to Bibliographic Search, Aho, A. V. and Corasick, M. J., Communications of the Association of Computing Machinery (ACM) Jun. 1975, vol. 18, No. 6. pp. 333-340.

Gigabit Rate Packet Pattern-Matching Using TCAM, Fang Yu, Randy H. Katz, and T.V. Lakshman, Proceedings of the Network Protocols, 12th IEEE International Conference on (ICNP'04), Oct. 5-18, 2004, pp. 174-183.

High Speed Pattern Matching for Network IDS/IPS, Alicherry, Muthuprasanna and Kumar, IEEE Sep. 2006, 1-4244-0596-9/06.

Ichiriu, M., "High Performance layer 3 Forwarding, The Need for Dedicated Hardware Solutions," White Paper, Application Note NCS05, Mar. 2001, 6 pages.

International Searching Authority, International Search Report for PCT/US03/26486, Feb. 4, 2004.

Masaki Hirata et al, "A Versatile Data String-Search VLSI," Apr. 1988, IEEE vol. 23, No. 2, pp. 329-335.

NetLogic Microsystems, "CIDR Longest Prefix Matching in Network Search Engines," Application Note NCS05, Mar. 2001, 4 pages.

Non-Final Office Action Mailed Mar. 16, 2009 in U.S. Appl. No. 10/700,722.

Over 10Gbps String Matching Mechanism for Multi-stream Packet Scanning Systems, Yutaka Sugawara, Mary Inaba, and Kei Hiraki, FPL 2004, LNCS 3203, pp. 484-493, 2004, J. Becker, M. Platzner, S. Vernalde, Editors.

Peng et al., "Content-Addressable memory (CAM) and its network applications," International IC—Taipei—Conference Proceedings, 3 pages.

Putting Routing Tables in Silicon, Tong-Bi Pei and Charles Zukowski, IEEE Network Magazine, Jan. 1992, vol. 6, No. 1, pp. 42-50.

VLSI Implementation of Routing Tables: Tries and CAMs, Tong-Bi Pei and Charles Zukowski, 1991 IEEE Infocom'91, Proceedings vol. 2, pp. 515-524.

Yu et al., "Efficient Multi-Match packet Classification with TCAM," Technical Report UCB/CSD-4-1316, Mar. 2004, 7 pages.

Final Office Action Mailed Mar. 2, 2010 in U.S. Appl. No. 11/533,204, 21 pages.

\* cited by examiner

US 7,889,727 B2

SWITCHING CIRCUIT IMPLEMENTING VARIABLE STRING MATCHING

RELATED APPLICATIONS

This is a divisional of U.S. patent application Ser. No. 11/248,901 filed Oct. 11, 2005 entitled "Switching Circuit Implementing Variable String Matching" by Michael J. Miller and Vladan Djakovic.

FIELD OF THE INVENTION

The present invention relates to the switching of Internet protocol (IP) packets. More specifically, the present invention relates to a content-aware switching application that examines the content of IP packets at non-deterministic locations, and switches the IP packets in response to the detected contents.

DISCUSSION OF RELATED ART

Wide scale adoption of network-based applications is projected to occur over time, with tremendous increases in the number of Internet data centers deployed worldwide, and tens of billions of dollars in hosting revenue. Most data centers are not engineered to be reliable or scalable enough to support such growth. Transferring both dynamic and static content instantaneously within data centers will demand a whole new level of intelligence, power and control. Achieving quality of service (QoS) for application delivery from the data center will require more then just bandwidth and speed. Deeper visibility into IP traffic and application protocols at the transaction level will also be necessary. To address these issues, Internet data centers will have to replace limited, enterprise-class legacy platforms with new purpose-built hardware and software.

FIG. 1 is a schematic diagram of a conventional TCP/IP packet 100. Packet 100 includes information designated layer 3 (L3), layer 4 (L4) and layer 7 (L7). Layer 3 includes a source address (SRC) 101 and a destination address (DST) 102. Layer 4 includes a source port identifier 103 and a destination port identifier 104. Layers 3 and 4 are located at deterministic locations of IP packet 100. Thus, it is relatively easy to locate and extract the information in Layers 3 and 4. As a result, most routing switches operate on the information present in Layers 3 and 4. However, as described above, it will become difficult, if not impossible, to switch packets at high speeds (OC-48, OC-192) based on Layers 3 and 4 as the number of Internet data centers increase.

IP packet 100 also includes Layer 7 information, which is located at non-deterministic locations of the packet. Layer 7 information provides deeper visibility into IP traffic and application protocols at the transaction level. Examples of Layer 7 information include the strings ".com" 105 and ".gif" 106. Because Layer 7 information is located at non-deterministic locations of packet 100, it is difficult to switch IP packet 100 based on the Layer 7 information.

Current known solutions for improving IP packet switching speed include the following. Multiple standard network processing units (NPUs) can be cascaded to obtain 1 gigabit/second (Gbps) switching speed. However, it is relatively expensive and power intensive to use multiple NPUs. Application specific integrated circuit (ASIC) solutions have also been used to obtain faster switching speeds. However, ASIC solutions require costly custom design and typically require a relatively large amount of memory.

PMC-Sierra Corp. has recently announced the ClassiPI™ Network Classification Processor, which is available as part number PM2329. This processor claims to enable analysis and classification for all layers of a packet, including payload, at wire speeds from 100 Mb/s to Gigabit LANs, as well as OC-48 and higher speed WANS. However, this processor is limited to 900 Mbps for Layer 7 processing.

Problems associated with matching a sequence of characters located at non-deterministic location of a packet (e.g., Layer 7) include the following. There will typically be a long list of expressions to match, making it difficult to match all expressions at an acceptable speed. There may also be multiple rule matches per packet. Moreover, the number of active expressions may vary with the particular input, which can have a large impact on performance. In addition, it may be difficult to update rules on the fly, such that dynamic applications (e.g., virtual private networks (VPNs)) may be implemented. Moreover, certain substrings, such as ".com" may match other strings, such as ".complaint", making comparisons difficult.

It would therefore be desirable to have a system and method that overcomes the above-described deficiencies and difficulties of the prior art.

SUMMARY

Accordingly, the present application provides a content aware switching application that examines the Layer 7 content of TCP/IP packets. The present invention uses a content matching engine (CME) to compare the sequence of characters in a packet against a list of "regular expressions" or "rules" to determine if there is a match. Based on a detected match, the packet will be switched to a server that is well suited to process the packet. For example, if the Layer 7 content of a packet identifies an image, then the packet will be switched to a server that specializes in processing images. Other rules can be used to implement functions such as load balancing, service priority, SPAM filtering, virus detection and mail forwarding.

Advantages of the CME include: the ability to offload NPU or ASIC task load; the ability to match a sequence of characters at real OC-48; the ability to store thousands of regular expressions or rules in a single device; and the ability to be updated on the fly.

In accordance with the present invention, the CME is implemented using a content addressable memory (CAM) array. Each rule is divided into a plurality of strings, which are stored in the CAM. The strings of each rule are linked, thereby providing a required order to the strings of the rule. In one embodiment, the strings of each rule are linked by per-entry counters associated with each string. In another embodiment, the strings of each rule are linked by a state machine. If the contents of a packet match all of the strings of a rule, in order, then the CME asserts a match signal along with an index value that identifies the matched rule. The basic approach requires that the CAM implement a search through a packet one character at a time, because the strings can start on any boundary. When the CAM detects a match, the CAM skips over the string that resulted in the match, thereby preventing subsequent erroneous matches. The CAM allows parallel matching to be performed for multiple rules. As a result, the processing time does not increase as the number of rules increases.

In one embodiment, the CME includes a shift register configured to receive and shift a packet in a byte-wise manner, thereby providing a pattern that changes by one byte every clock cycle. The pattern is provided to a CAM array having a plurality of entries configured to store a corresponding plurality of strings that identify a first rule. Each of the entries is coupled to receive the pattern in parallel from the shift register, and assert a match output signal if the string stored in the CAM entry matches the pattern.

Each of the CAM entries is coupled to provide a match output signal to a corresponding entry counter. Each of the entry counters stores a count value associated with the length of the string stored in the corresponding CAM entry. When a CAM entry asserts a match signal, the corresponding entry counter starts to count down to zero. Upon reaching zero, the entry counter asserts an enable signal, which is applied to a subsequent CAM entry (or to a priority encoder, if the entry counter is the last entry counter of the rule). This manner, the various strings stored in the CAM entries are linked.

In another embodiment, the CME includes a shift register configured to receive and shift a packet in a byte-wise manner, thereby providing a pattern that changes by one byte every clock cycle. The pattern is provided to a CAM array having a plurality of entries configured to store a corresponding plurality of strings that identify a first rule. Each of the entries is coupled to receive the pattern in parallel from the shift register.

Each of the CAM entries has a corresponding state identifier block that stores a corresponding state identifier value. A state register stores a current state identifier value. A CAM entry is only enabled if the state identifier value corresponding to the CAM entry matches the current state identifier value stored in the state register. If a CAM entry is enabled, and the contents of the CAM entry matches the pattern, the CAM entry will assert a match signal.

The CME further includes a priority encoder that receives the match signal, and in response, asserts a match signal and an index signal. The match and index signals are used to access a corresponding entry in an SRAM array. This entry includes a new state identifier value and a count value. The new state identifier value is loaded into the state register, thereby becoming the current state identifier value. The count value, which corresponds to the length of the CAM entry that caused the match, is loaded into a counter. The counter is decremented to a zero count over one or more clock cycles. The CAM array is only enabled when the counter has a zero count, thereby preventing erroneous matches. In this manner, the various strings of the rule are linked in the desired order.

In one variation, each CAM entry can also include a byte location indicator, which indicates the byte location within the packet where the corresponding string must exist in order to result in a match. A byte counter is reset upon receiving each new packet, and is incremented each time the packet is shifted in the shift register, such that the count of the byte counter identifies the original byte location of the first byte of the shifted pattern. The count of the byte counter is applied to the byte location indicator in each of the CAM entries, such that actual byte location must match the byte location of the byte location indicator in order for a match to exist.

The present invention will be more fully understood in view of the following description and drawings.

DETAILED DESCRIPTION

Figure 1:
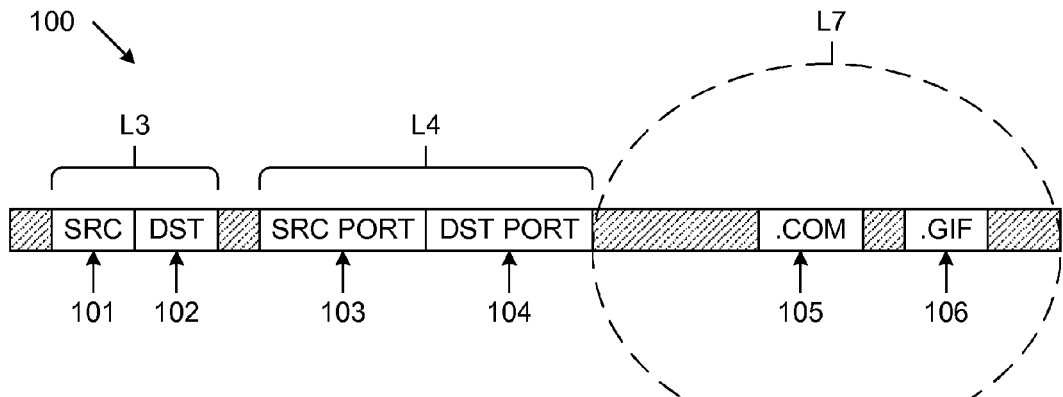
FIG. 1 is a schematic drawing of a conventional Internet protocol packet.
Figure 2:
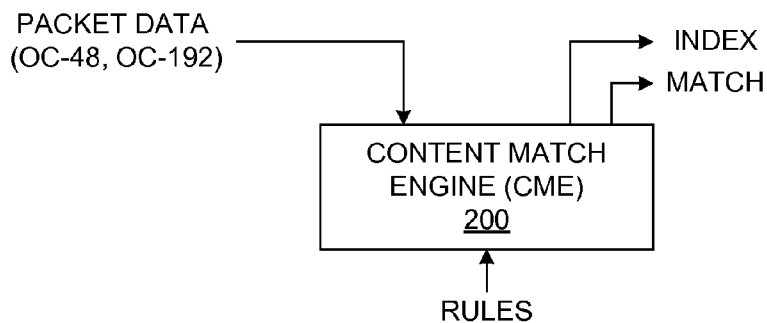
FIG. 2 is a block diagram of a content matching engine (CME) in accordance with one embodiment of the present invention.

FIG. 2 is a block diagram of a content matching engine (CME) 200 in accordance with one embodiment of the present invention. CME 200 has an input port for receiving packet data at a 2.4 Gbps (OC-48) or a 10 Gbps rate (OC-192). CME 200 also has an input port for receiving a set of rules, which are stored in CME 200. CME 200 determines whether each incoming packet matches any of the rules. If CME 200 determines that a match exists, then CME 200 asserts a MATCH signal and provides an INDEX signal associated with the matched rule.

Figure 3:
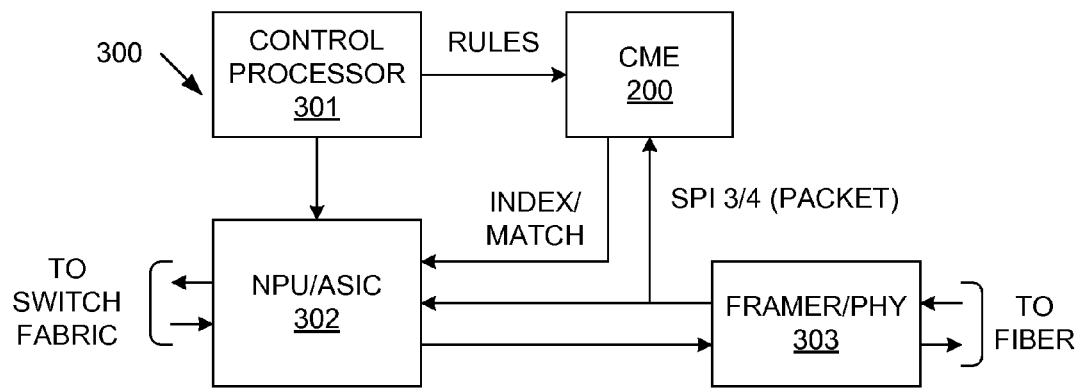
FIG. 3 is a block diagram of a system that uses the CME of FIG. 2 in accordance with one embodiment of the present invention.

FIG. 3 is a block diagram of a system 300 that uses CME 200. In addition to CME 200, system 300 includes control processor 301, network processing unit (NPU)/ASIC 302 and framer/PHY 303. Control processor 301 loads the rules into CME 200. Control processor 301 also loads instructions into NPU/ASIC 302. These instructions define the manner in which NPU/ASIC 302 processes a received packet when the received packet matches one of the rules. Framer/PHY 303 receives and aligns data packets from a fiber-optic network, and provides the aligned data packets to CME 200 and NPU/ASIC 302. If CME 200 determines that a received packet matches one of the rules, CME 200 asserts the MATCH signal and provides an INDEX value associated with the matched rule to NPU/ASIC 302. In response to the MATCH/INDEX signals, NPU/ASIC 302 routes the packet through a switch fabric to an output port, which is designed to efficiently process the packet in view of the matched rule.

Figure 4:
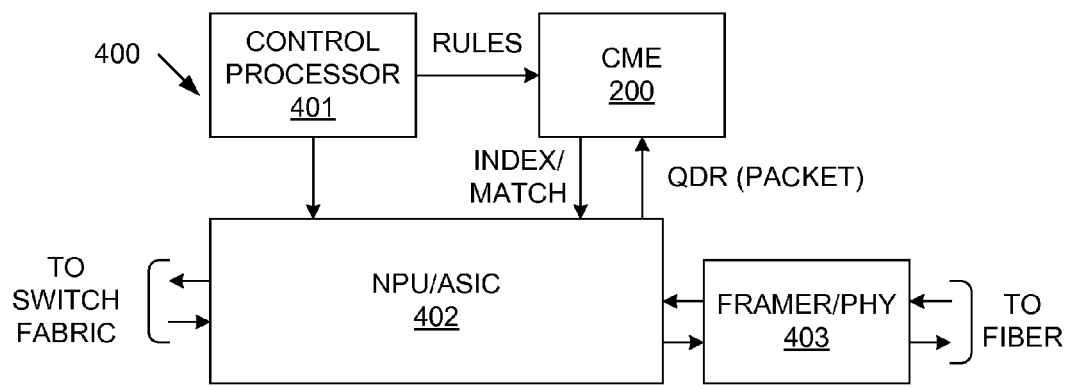
FIG. 4 is a block diagram of a system that uses the CME of FIG. 2 in accordance with another embodiment of the present invention.

FIG. 4 is a block diagram of an alternate system 400 that uses CME 200. In addition to CME 200, system 400 includes control processor 401, network processing unit (NPU)/ASIC 402 and framer/PHY 403. System 400 is controlled in a manner similar to system 300. However, system 400 uses quad data rate (QDR) packets, whereas system 300 uses a SPI3 or SPI4.2 style packet interface.

The list of rules stored in CME 200 might be defined as set forth below in Table 1.

TABLE 1

Is the packet an image request?
Is the packet a CGI script transaction?
Does the packet include a cookie?
Is the packet an FTP transaction?
Is the packet from a paying customer?
Is the packet SPAM?

The first rule in Table 1 may be expressed as follows in accordance with one embodiment of the present invention.

http://www.*.com*(.gif/.jpg)

Figure 5:
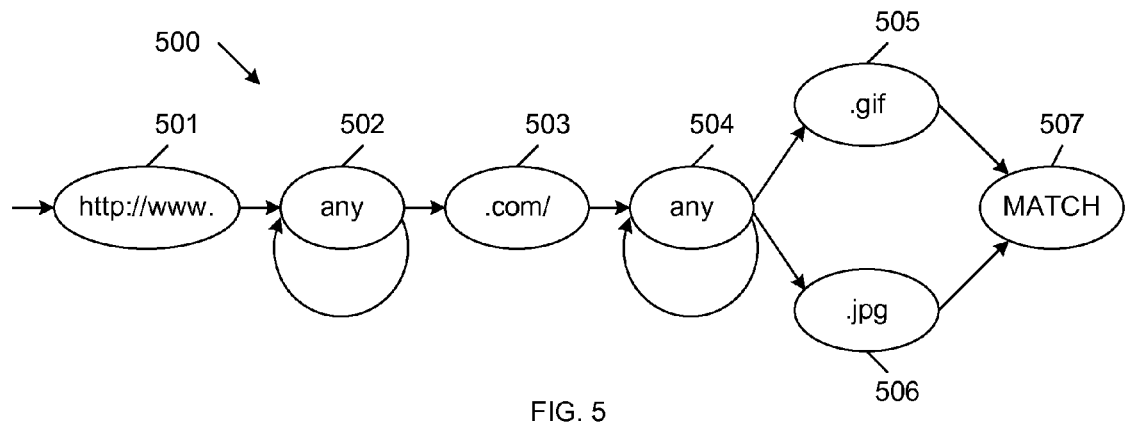
FIG. 5 is a flow diagram illustrating a rule that includes the strings: "http://www.", "*", ".com/", "*", and ".gif" or ".jpg", wherein "*" represents "any symbol".

In this rule, the string "*" represents "any symbol". FIG. 5 is a flow diagram illustrating this rule, which is hereinafter referred to as rule 500. Thus, in accordance with rule 500, an incoming packet is examined to determine whether the packet contains the string "http://www." (Step 501). If the string "http://www." is detected, then the incoming packet is further examined to determine whether the packet contains any subsequent symbol (Step 502). If a subsequent symbol is detected, the packet is further examined to determine whether subsequent symbols of the packet contain the string ".com/" (Step 503). If the string ".com/" is detected, then the incoming packet is further examined to determine whether the packet contains any subsequent symbol (Step 504). If a subsequent symbol is detected, the packet is further examined to determine whether subsequent symbols of the packet contain either the string ".gif" (Step 505) or the string ".jpg" (Step 506). If either one of the strings ".gif" or ".jpg" are detected in Steps 505 or 506, then CME 200 will assert the MATCH signal (Step 507). CME 200 will also provide a corresponding INDEX signal in response to the asserted MATCH signal. These MATCH and INDEX signals are then used by an NPU/ASIC to route the packet to a server that is suited to processing images. Note that the symbols required to create a match with rule 500 are typically found at non-deterministic locations within Layer 7 of a packet that includes an image request.

Other rules can be used to implement functions such as load balancing, service priority, SPAM filtering, virus detection and mail forwarding. Appendix A lists additional exemplary rules that may be used in accordance with the present invention. It is understood that the rules are not limited by these examples.

Figure 6:
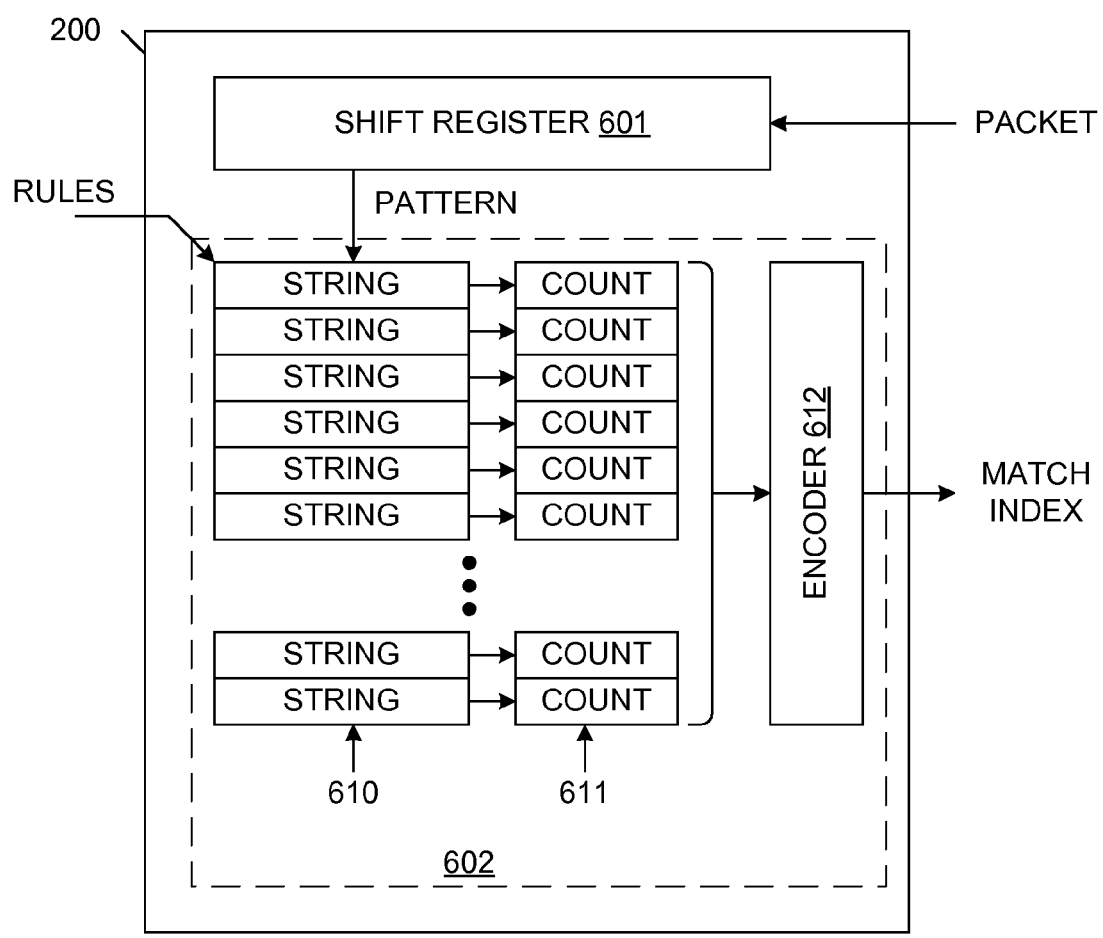
FIG. 6 is a block diagram illustrating the CME of FIG. 2 in more detail in accordance with one embodiment of the present invention.

FIG. 6 is a block diagram of CME 200 in accordance with one embodiment of the present invention. CME 200 includes shift register 601 and content addressable memory (CAM) array 602. In the described embodiment, CAM array 602 includes a plurality of CAM entries 610, a corresponding plurality of entry counters 611, and an encoder 612. Each of CAM entries 610 is capable of storing a string of symbols and each of entry counters 611 is capable of storing a count value for the corresponding entry. The rules are loaded into one or more entries of CAM array 602. Shift register 601 is coupled to receive the incoming data packet. The contents of shift register 601 are provided to CAM array 602 as a symbol pattern (PATTERN). The PATTERN provided by shift register 601 is compared (in parallel) with the strings stored in CAM entries 610.

Figure 7:
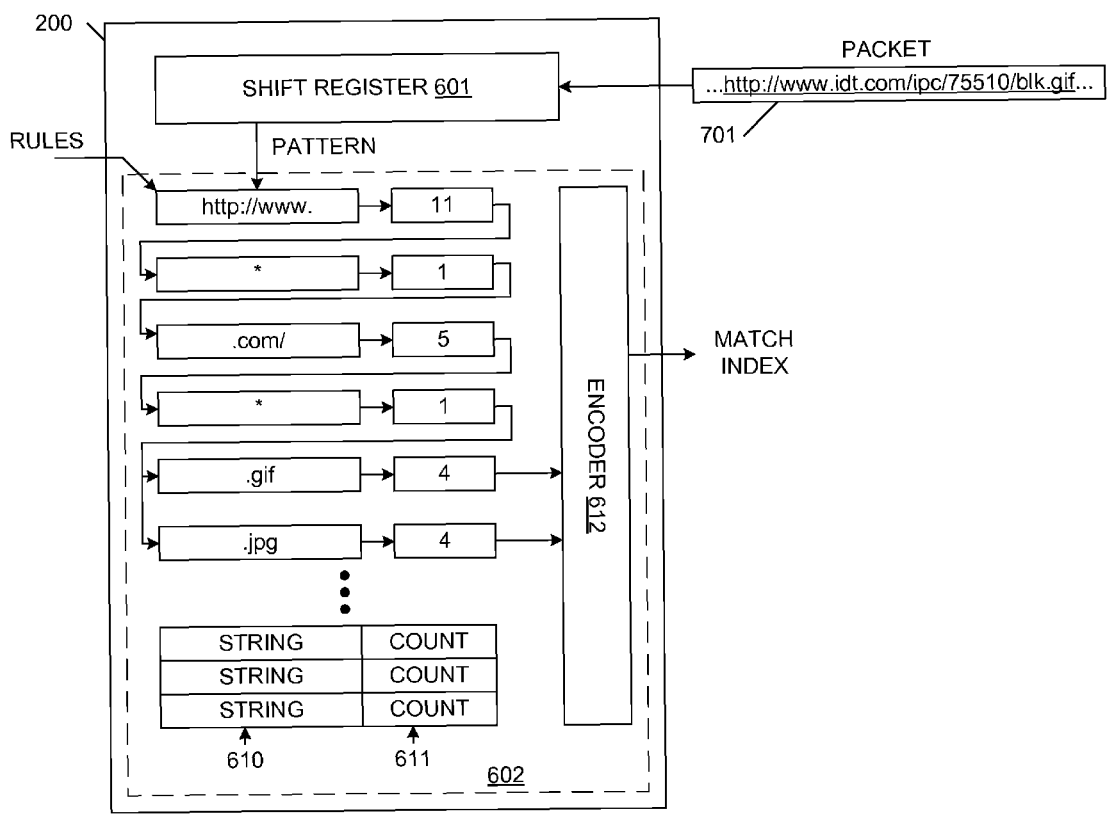
FIG. 7 is a block diagram illustrating the CME of FIG. 6 configured to implement the rule of FIG. 5 in accordance with one embodiment of the present invention.

FIG. 7 is a block diagram illustrating the CAM array 602 loaded with strings associated with rule 500. Each of the strings is assigned a count corresponding to the number of symbols in the string. Although not illustrated in FIG. 7, many other rules can be stored in CAM array 602. All of these rules are processed in parallel in the manner described below.

In the described example, a packet 701 that includes the symbols " . . . http://www.idt.com/ipc/77510/blk.gif . . . " at non-deterministic locations is loaded into shift register 601. When packet 701 is initially loaded into shift register 601, the PATTERN provided by shift register 601 does not match the contents of any of the CAM entries 610. Each clock cycle, shift register 601 is controlled to shift the contents of packet 701 to the left by one symbol.

Figures 8, 9:
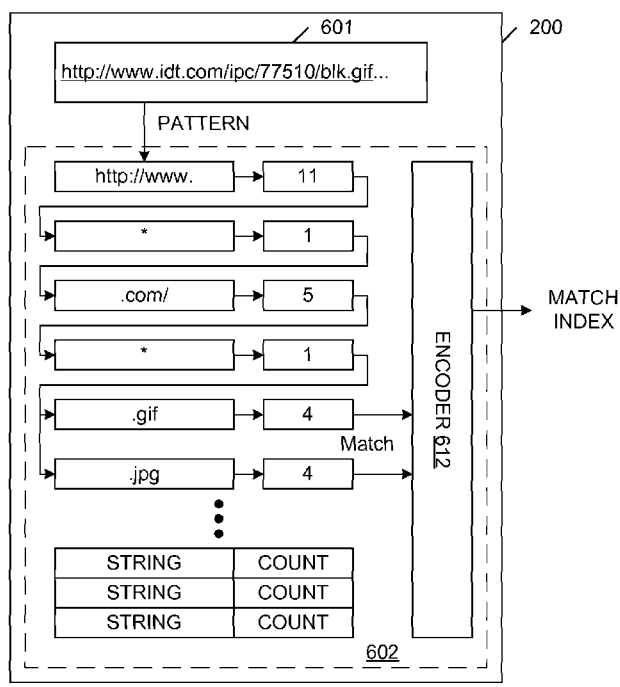
FIG. 8 is a block diagram illustrating the CME of FIG. 7, when the packet is shifted such that the string "http://www." is applied to a CAM array of the CME.
FIG. 9 is a block diagram that illustrates the manner in which the string "http://www." is shifted over eleven clock cycles, along with the count of a corresponding entry counter.

As illustrated in FIG. 8, packet 701 is eventually shifted such that the PATTERN begins with the string "http://www.". At this time, the first entry of CAM array 602 detects a match, and enables the counter associated with the first entry of CAM array 602 (hereinafter, the first entry counter). At this time, the first entry counter stores a count value of "11".

FIG. 9 illustrates the PATTERN and the associated count of the first entry counter over the next eleven clock cycles. Thus, during the next clock cycle, packet 701 is shifted left by one symbol, and the first entry counter is decremented by one to a count of "10". This shifting/decrementing continues until the count of the first entry counter reaches "0". When the count of the first entry counter reaches "0", the first entry counter asserts an enable signal, which is applied to the second entry of CAM array 602. The first entry counter is then reset to a count of "11". Note that processing does not continue to the next string of the rule until the matched string of the rule has been shifted out of register 601. This prevents erroneous matches from occurring.

When the first entry counter asserts the enable signal, the second entry of CAM array 602 (i.e., "*", or "any symbol") will match the PATTERN (shown as the last PATTERN of FIG. 9). As a result, the counter associated with the second entry of CAM array 602 (hereinafter, the second entry counter) is enabled. During the next clock cycle, the second entry counter will be decremented to a count of "0". Upon reaching a count of "0", the second entry counter will assert an enable signal, which is applied to the third entry of CAM array 602.

Packet 701 continues to be shifted through register 601. After two more clock cycles, the PATTERN begins with the string ".com/". At this time, the third entry of CAM array 602 detects a match, and enables the counter associated with the third entry of CAM array 602 (hereinafter, the third entry counter). At this time, the third entry counter has a value of "5". Processing continues, with the string ".com/" being shifted out of register 601 and the third entry counter being decremented to a count of "0" over the next five clock cycles. Upon reaching a count of "0", the third entry counter asserts an enable signal, which is applied to the fourth entry of CAM array 602.

When the third entry counter asserts the enable signal, the fourth entry of CAM array 602 (i.e., "any symbol") will match the PATTERN (i.e., "ipc/7750/blk.gif"). As a result, the counter associated with the fourth entry of CAM array 602 (hereinafter, the fourth entry counter) is enabled. During the next clock cycle, the fourth entry counter will be decremented to a count of "0". Upon reaching a count of "0", the fourth entry counter will assert an enable signal, which is applied to both the fifth and sixth entries of CAM array 602.

Packet 701 continues to be shifted through register 601. After twelve more clock cycles, the PATTERN begins with the string ".gif". At this time, the fifth entry of CAM array 602 detects a match, and enables the counter associated with the fifth entry of CAM array 602 (hereinafter, the fifth entry counter). At this time, the fifth entry counter has a value of "4". Processing continues, with the string ".gif" being shifted out of register 601 and the fifth entry counter being decremented to a count of "0" over the next four clock cycles. Upon reaching a count of "0", the fifth entry counter asserts a Match signal, which is applied to encoder 612. In response, encoder 612 asserts a MATCH signal and an INDEX signal, wherein the INDEX signal identifies the rule that resulted in the match (i.e., rule 500).

Note that if the PACKET included the string ".jpg" instead of the string ".gif", then the sixth entry of CAM array 602 would have detected a match, and the sixth entry counter would have asserted a Match signal.

Also note that CAM array 602 is capable of storing many rules. For example, CAM array 602 can include 16K entries, each having a width of 64-bits (or eight 8-bit bytes), in one embodiment of the present invention. The PATTERN is compared with all 16K entries in parallel, thereby reducing the required comparison time. In the described embodiment, CAM array 602 operates at a frequency in the range of 200 to 300 MHz. With a symbol (byte) size of 8-bits, this enables comparisons to be performed at OC-48. Advantageously, CME 200 exhibits relatively low power consumption, because a limited number of entries are enabled at any given time. In addition, CME 200 is able to offload task load from the associated NPU/ASIC. Moreover, CME 200 can be easily updated on the fly by modifying the contents of CAM array 602.

Figure 10:
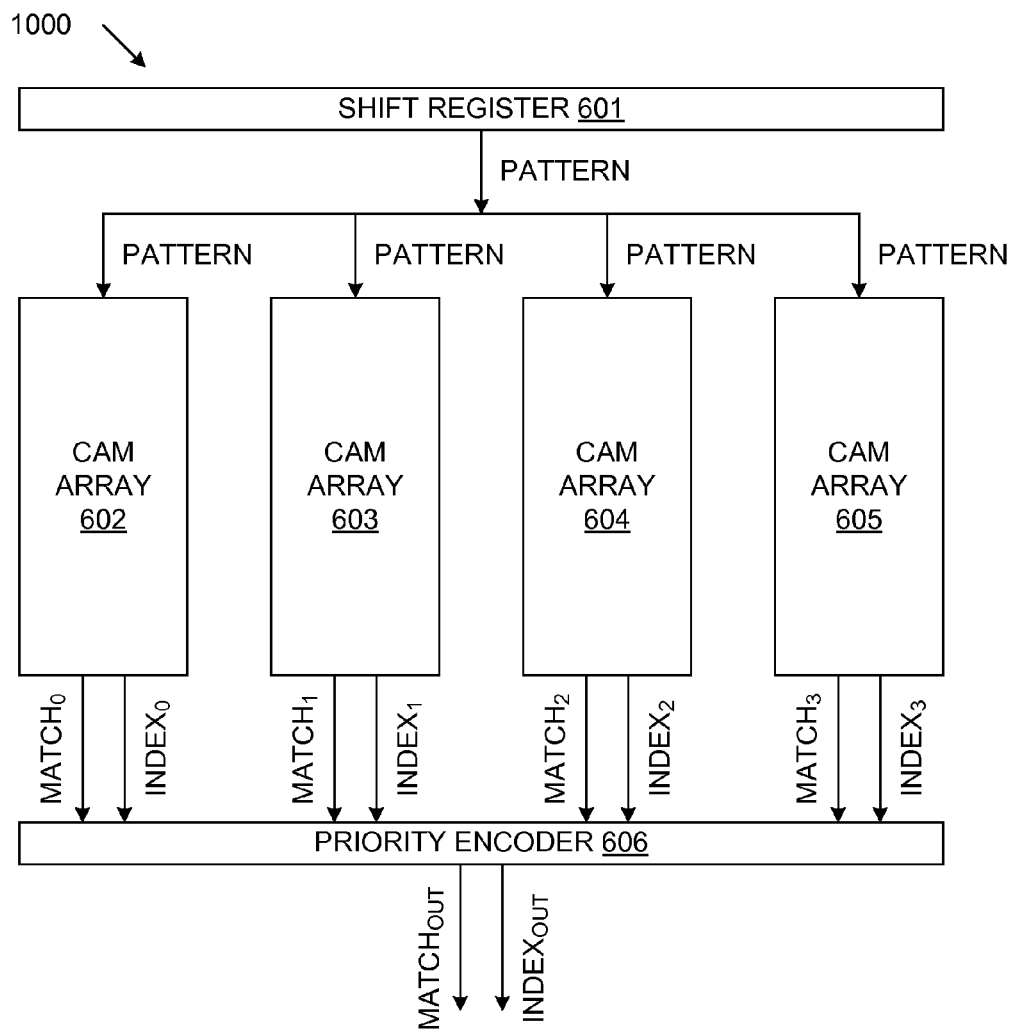
FIG. 10 is a block diagram illustrating a CME that implements a plurality of CAM arrays connected in parallel in accordance with one embodiment of the present invention.

In one variation, the PATTERN can be provided to parallel CAM arrays. FIG. 10 is a block diagram illustrating a CME 1000, which implements parallel CAM arrays 602-605. In the described embodiment, CAM arrays 603-605 are identical to CAM array 602, although this is not necessary. Shift register 601 applies the PATTERN to CAM arrays 602-605 in parallel. In response, CAM arrays 602-605 generate match signals $MATCH_0$-$MATCH_3$ and index signals $INDEX_0$-$INDEX_3$, respectively, in the manner described above. Priority encoder 606 selects the MATCH and INDEX signals generated by one of the CAM arrays 602-605, and transmits these MATCH and INDEX signals as the output signals, $MATCH_{OUT}$ and $INDEX_{OUT}$. CME 1000 advantageously increases the number of entries/rules, without increasing the required comparison time. CME 1000 enables comparisons to be performed at OC-192.

Figure 11:
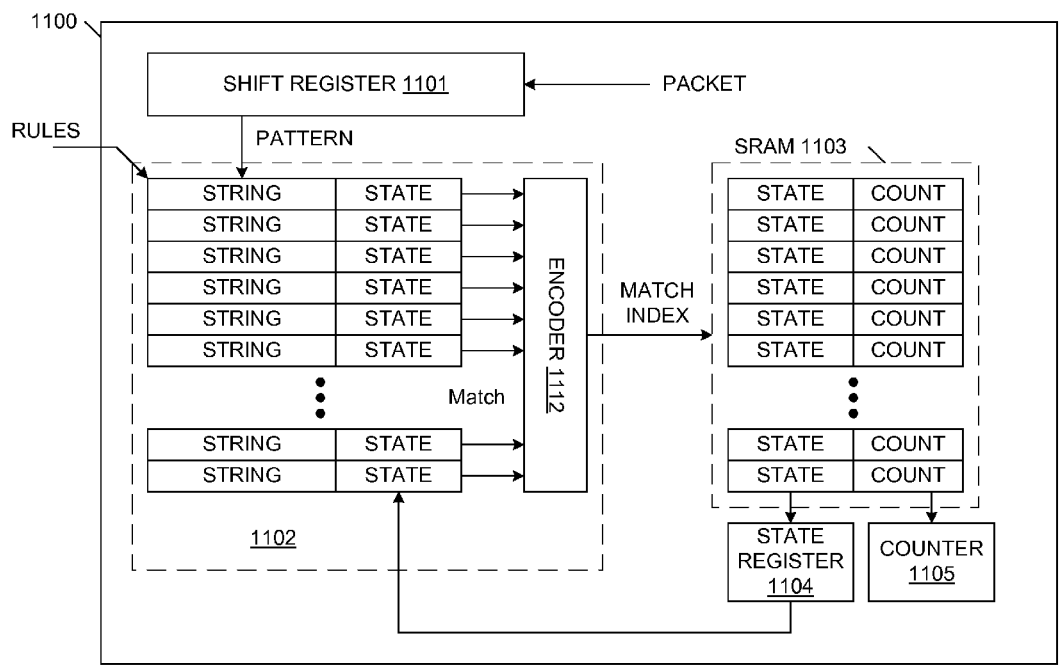
FIG. 11 is a block diagram of a CME which implements a state machine in accordance with another embodiment of the present invention.

FIG. 11 is a block diagram of a CME 1100 in accordance with another embodiment of the present invention. CME 1100 includes shift register 1101, relatively small CAM block 1102, SRAM block 1103, state register 1104 and counter 1105. In the described embodiment, CAM block 1102 includes 64 entries, with each entry having 32 symbols. The relatively small size of CAM block 1102 ensures that the CAM block exhibits a relatively fast cycle time (e.g., 3.3 nanoseconds). Each of the entries of CAM array 1102 includes a string and a corresponding state identifier. Each rule is written to CAM array 1102 as a series of strings and state identifiers.

Encoder 1112 receives the Match signals generated by the entries, and in response, provides an asserted MATCH signal and a corresponding INDEX value to SRAM 1103. SRAM 1103 includes a plurality of entries, wherein each entry includes a state identifier and a corresponding count value. Each of the entries of SRAM 1103 corresponds with an entry in CAM array 1102. In the described example, the $N^{th}$ entry of CAM array 1102 corresponds with the $N^{th}$ entry of SRAM 1103, although other mapping schemes can be used in other embodiments. One of the state identifiers from SRAM 1103 is loaded into state register 1104, and the corresponding count value is loaded into counter 1105. The state identifier stored by state register 1104 is provided to CAM array 1102. CAM array 1102 enables only the entries having the same state identifier as the state identifier stored in state register 1104.

Figure 12:
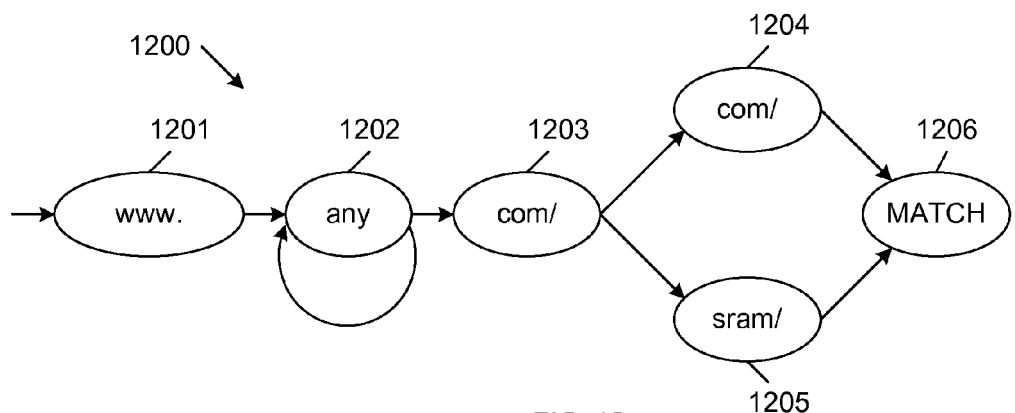
FIG. 12 is a flow diagram which illustrates a rule that requires the strings "www.", "*", "com/" and either "com/" or "sram/" to be detected, in order.

The operation of CME 1100 will now be described using the rule 1200 illustrated in FIG. 12, which requires the strings "www." (1201), "*" (1202), "com/" (1203) and either "com/" (1204) or "sram/" (1205) to be detected, in order.

Figure 13:
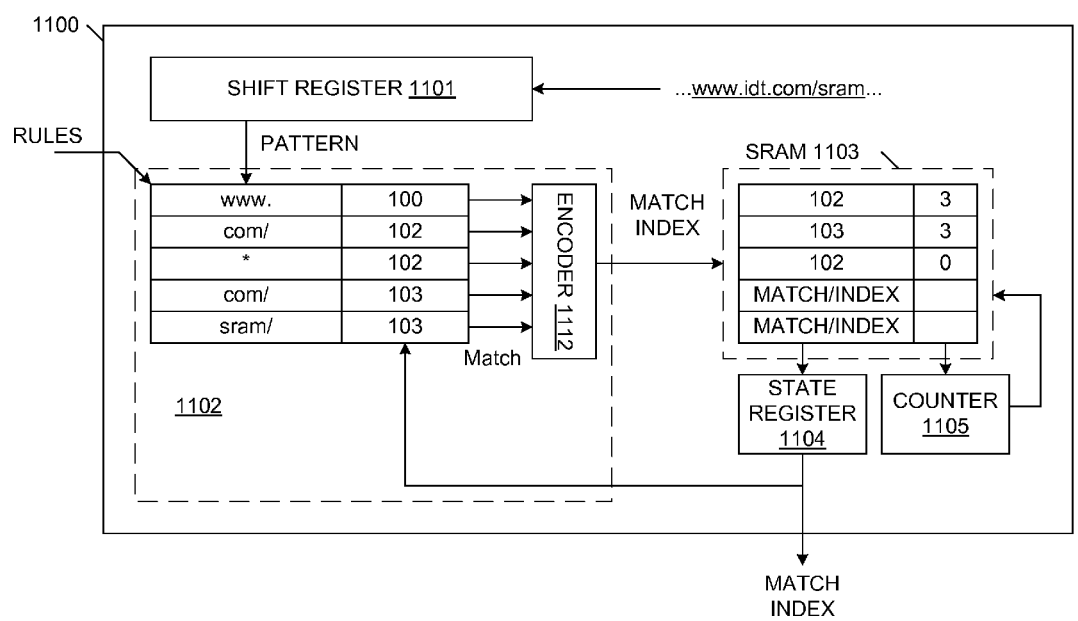
FIG. 13 is a block diagram illustrating the CME of FIG. 11 configured to implement the rule of FIG. 12 in accordance with one embodiment of the present invention.

FIG. 13 is a block diagram illustrating the manner in which CME 1100 is loaded to implement rule 1200. In the described example, a packet that includes the string . . . www.idt.com/sram/ . . . is applied to shift register 1101. At the beginning of the comparison, state register 1104 is loaded with the initial state identifier of "100". This state identifier of "100" is applied to CAM array 1102, thereby enabling the first entry of CAM array 1102, which stores a state identifier equal to "100". Also at the beginning of the comparison, the count value stored by counter 1105 is set to "0". Counter 1105 is configured to enable SRAM 1103 only when the count value stored in counter 1105 has a value of "0". Counter 1105 is configured to disable SRAM 1103 when the count value has a value other than "0".

The packet is shifted into shift register 1101 until the PATTERN begins with the string "www.". At this time, the first entry of CAM array 1102 detects a match, and asserts a corresponding Match signal. In response, encoder 1112 asserts a MATCH signal and generates an INDEX signal corresponding with the first entry of SRAM 1103. In response, the first entry of SRAM 103 is accessed, thereby loading state register 1104 with a value of "102", and counter 1105 with a count value of "3".

The state identifier value of "102" is routed to CAM array 1102, thereby enabling the second and third entries of CAM array 1102, which store state identifiers equal to "102". Over the next three clock cycles, the string "www." is shifted out of shift register 1101, and counter 1105 decrements the count value to "0". At this time, the PATTERN begins with string "idt.com/sram/", and the third entry of CAM array 1102 (i.e., "*") detects a match. As a result, the third entry of CAM array 1102 asserts a corresponding Match signal, thereby causing encoder 1112 to assert a MATCH signal and generate an INDEX signal corresponding with the third entry of SRAM 1103. In response, the third entry of SRAM 103 is accessed, thereby loading state register 1104 with a value of "102", and counter 1105 with a count value of "0". The state identifier value of "102" continues to enable the second and third entries of CAM array 1102, while the count value of "0" enables SRAM 1103.

The packet is shifted for three more cycles, until the PATTERN begins with the string "com/sram/". At this time, the second entry of CAM array 1102 detects a match, and asserts a corresponding Match signal. In response, encoder 1112 asserts a MATCH signal, and generates an INDEX signal corresponding with the second entry of SRAM 1103. In response, the second entry of SRAM 103 is accessed, thereby loading state register 1104 with a value of "103", and counter 1105 with a count value of "3". The state identifier value of "103" is provided to CAM array 1102, thereby enabling the fourth and fifth entries of CAM array 1102, which store state identifier values of "103".

Over the next three clock cycles, the string "com/" Is shifted out of shift register 1101, and counter 1105 decrements to a count value of "0". At this time, the PATTERN begins with string "sram/", and the fifth entry of CAM array 1102 detects a match. As a result, the fifth entry of CAM array 1102 asserts a corresponding Match signal, thereby causing encoder 1112 to assert a MATCH signal and generate an INDEX signal corresponding with the fifth entry of SRAM 1103. In response, the fifth entry of SRAM 103 is accessed, thereby loading state register 1104 with a MATCH signal and an associated INDEX value. This MATCH signal and INDEX value are provided as an output of CME 1100.

Figure 14:
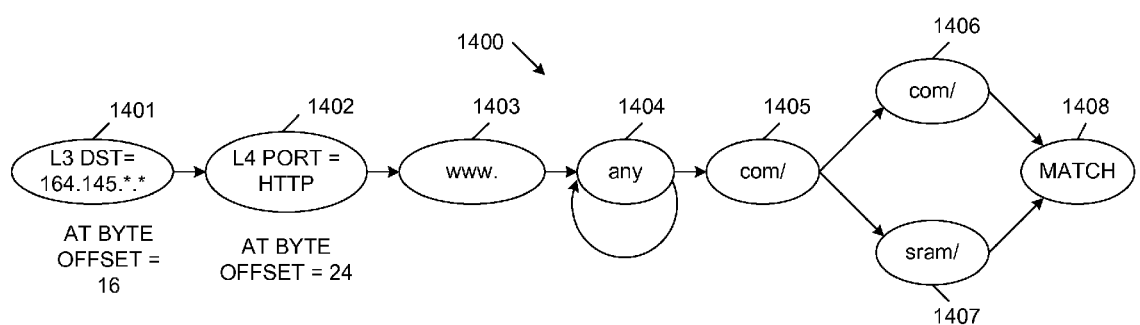
FIG. 14 is a flow diagram of a rule that requires a destination address (Layer 3) of "164.145.*.*" beginning at byte location 16 of the packet, a destination port address (Layer 4) of "33" beginning at byte location 24, followed in order by "www.", "*" (any symbol), "com/" and "com/" or "sram/".

In another embodiment of the present invention, certain rules may require that certain strings be located at predetermined locations of in the packet. FIG. 14 is an example of a rule 1400 that requires a destination address (Layer 3) of "164.145.*.*" beginning at byte location 16 of the packet, a destination port address (Layer 4) of "33" (i.e., "http://") beginning at byte location 24, followed in order by "www.", "*" (any symbol), "com/" and "com/" or "sram/".

In order to implement these additional rules, CME 1100 must be modified to keep track of the current byte location of the shifted PACKET. In addition, the entries of CAM array 1102 must be modified to store the relevant predetermined byte locations.

Figure 15:
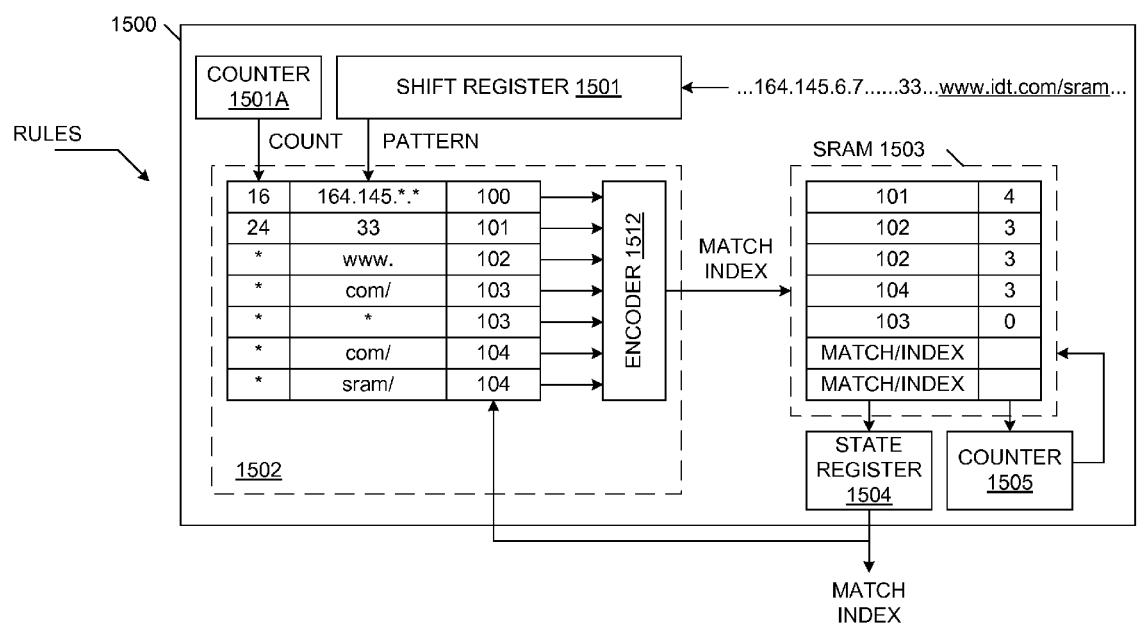
FIG. 15 is a block diagram of a CME configured to implement the rule of FIG. 14 in accordance with one embodiment of the present invention.

FIG. 15 is a block diagram of a CME 1500, which is configured to process rule 1400. CME 1500 includes shift register 1501, byte location counter 1501A, CAM block 1502, SRAM block 1503, state register 1504 and counter 1505. Shift register 1501, CAM array 1502, SRAM block 1503, state register 1504 and counter 1505 operate in substantially the same manner as shift register 1101, CAM array 1102, SRAM block 1103, state register 1104 and counter 1105 of CME 1100, with the differences noted below.

Byte location counter 1501A is reset to a "0" value upon loading a PACKET into shift register 1501. Each time that the PACKET is shifted within shift register 1501, the byte location counter 1501A is incremented. Thus, the count of byte location counter 1501A identifies the byte location of the first byte of the PATTERN. CAM array 1502 is subdivided to include a third column that stores the predetermined byte locations associated with the rule. Thus, the first entry of CAM array 1502 stores a predetermined byte location of "16" and the second entry of CAM array 1502 stores a predetermined byte location of "24". The other entries of CAM array 1502 associated with rule 1400 store "don't care" values (*).

In the described example, a packet that includes the string " . . . 164.145.6.7. . . . 33 . . . www.idt.com/sram/ . . . " is applied to shift register 1501, wherein the byte "164" is aligned with the 16$^{th}$ byte location of the packet, and the byte "33" is aligned with the 24$^{th}$ byte location of the packet. At the beginning of the comparison, byte location counter 1501A is loaded with "0", state register 1504 is loaded with the initial state value of "100", and counter 1505 is loaded with "0".

When the PACKET has been shifted such that the PATTERN begins with "164.145.6.7 . . . ", the COUNT of counter 1501A will be "16". At this time, the both the COUNT of counter 1501A and the PATTERN match the first entry of CAM array 1502. As a result, the first entry of SRAM 1503 is accessed, with state indicator "101" being loaded into state register 1504, and "4" being loaded into counter 1505. The state indicator "101" enables the second entry of CAM array 1502.

When the PACKET has been shifted such that the PATTERN begins with "33 . . . ", the COUNT of counter 1501A will be "24". At this time, the both the COUNT of counter 1501A and the PATTERN match the second entry of CAM array 1502. As a result, the second entry of SRAM 1503 is accessed, with state indicator "102" being loaded into state register 1504, and "3" being loaded into counter 1505. The state indicator "102" enables the third entry of CAM array 1502. Processing then continues in a manner consistent with that described above in connection with FIG. 13, with the third, fourth, fifth and seventh entries of CAM array 1502 sequentially matching the contents of the PACKET, such that CME 1500 provides the MATCH and INDEX signals stored in the seventh entry of SRAM 1503 as output signals.

Although byte location counter 1501A has been described in combination with the circuitry of CME 1100, it is understood that this byte location counter can also be implemented with the circuitry of CME 200.

The present invention advantageously addresses the market trend towards intelligent network applications. The CAM core of the CME advantageously provides for position independent string matches for Layer 7 information. The CAM core is also capable of providing position dependent string matches for Layer 3 and Layer 4 information. The CME of the present invention provides for higher performance than existing NPUs, provides a more robust solution for regular expressions, and provides a lower part count than existing solutions using NPUs. Moreover, the CME of the present invention can be expanded to OC-192.

The CME of the present invention can be used to implement many different content aware applications. For example, the CME of the present invention can be used to implement web switching applications which perform load balancing of HTML servers, controlling routing to image servers and CGI transaction servers, and providing service priority by user or activity. The CME of the present invention can also be used to filter web content, or implement a security firewall. Moreover, the CME of the present invention can be used to filter and steer e-mail (e.g., SPAM filtering, virus detection and e-mail forwarding).

Although the invention has been described in connection with several embodiments, it is understood that this invention is not limited to the embodiments disclosed, but is capable of various modifications, which would be apparent to a person skilled in the art. Thus, the invention is limited only by the following claims.

We claim:

1. A method of processing a data packet comprising:
    comparing the data packet with a list of regular expressions or rules stored in a content addressable memory (CAM) array to determine if the data packet matches any of the regular expressions or rules;
    wherein comparing the data packet comprises:
        (a) comparing the data packet with the regular expressions and rules stored in the CAM array;
        (b) shifting the data packet by one symbol, thereby providing a shifted pattern;
        (c) comparing the shifted pattern with the regular expressions and rules stored in the CAM array; and
        (d) repeating steps (b) and (c) until the entire data packet has been shifted and compared with the regular expressions and rules stored in the CAM array;
    upon detecting a match between the data packet and a regular expression or rule, switching the data packet to a server designated for processing data packets exhibiting the regular expression or rule;

asserting a first match signal when the data packet or shifted pattern matches a first entry of the CAM array having a length of N symbols; and preventing a second entry of the CAM array from asserting a second match signal until after the data packet or shifted pattern has been shifted N times after the first match signal is asserted.

2. The method of claim 1, further comprising asserting a second match signal when the shifted pattern matches the second entry of the CAM array after the data packet or shifted pattern has been shifted N times after the first match signal is asserted.

3. The method of claim 2, wherein the first entry and second entry of the CAM array comprise the regular expressions or rules.

4. The method of claim 2, further comprising:

generating an index signal in response to the asserted second match signal; and rerouting the data packet in response to the index signal.

5. The method of claim 1, further comprising:

storing the count N in a location associated with the first entry; and loading the count N from the location into a counter when the first match signal is asserted.

6. The method of claim 1, further comprising using a state machine to implement the step of preventing.

7. The method of claim 1, wherein one of the regular expressions or rules determines whether the data packet includes an image request.

8. The method of claim 1, wherein one of the regular expressions or rules determines whether the data packet includes a CGI script transaction.

9. The method of claim 1, wherein one of the regular expressions or rules determines whether the data packet includes a cookie.

10. The method of claim 1, wherein one of the regular expressions or rules determines whether the data packet includes an FTP transaction.

11. The method of claim 1, wherein one of the regular expressions or rules determines whether the data packet is sent by a paying customer.

12. The method of claim 1, wherein one of the regular expressions or rules determines whether the data packet is SPAM.

13. The method of claim 1, wherein one of the regular expressions or rules determines whether the data packet is an advertisement.

14. The method of claim 1, wherein one of the regular expressions or rules determines whether the data packet is a banner.

15. The method of claim 1, wherein one of the regular expressions or rules comprises: a first predetermined string, followed by any symbol, followed by a second predetermines string, followed by any symbol, followed by a third or fourth predetermined string.

16. The method of claim 15, wherein the data packet is an internet protocol (IP) packet, and wherein the first, second, third, and fourth predetermined strings are located in Layer 7 of the IP packet.

17. The method of claim 1, wherein one of the regular expressions comprise strings, wild cards, and character subsets.

18. The method of claim 1, further comprising revising the regular expressions and rules stored in the CAM array on the fly.

19. The method of claim 1, further comprising processing the data packet at 2.4 giga-bits per second, or faster.

20. A method of processing a data packet comprising:

comparing the data packet with a list of regular expressions or rules stored in a plurality of parallel content addressable memory (CAM) arrays to determine if the data packet matches any of the regular expressions or rules;

wherein comparing the data packet comprises:

(a) comparing the data packet with the regular expressions and rules stored in the CAM array;

(b) shifting the data packet by one symbol, thereby providing a shifted pattern;

(c) comparing the shifted pattern with the regular expressions and rules stored in the CAM array; and (d) repeating steps (b) and (c) until the entire data packet has been shifted and compared with the regular expressions and rules stored in the CAM array;

upon detecting a match between the data packet and a regular expression or rule, switching the data packet to a server designated for processing data packets exhibiting the regular expression or rule;

asserting a first match signal when the data packet or shifted pattern matches a first entry of the CAM array having a length of N symbols; and preventing a second entry of the CAM array from asserting a second match signal until after the data packet or shifted pattern has been shifted N times after the first match signal is asserted.

21. The method of claim 20, further comprising processing the data packet at 10 giga-bits per second, or faster.

* * * * *